United States Patent [19]

Greenwood

[11] Patent Number: 4,576,712
[45] Date of Patent: Mar. 18, 1986

[54] MAINTAINING GAS FLOW DURING TRANSFER OF SOLIDS IN HYDROCARBON CONVERSION AND GAS-SOLID CONTACTING PROCESSES

[75] Inventor: Arthur R. Greenwood, Niles, Ill.

[73] Assignee: UOP Inc., Des Plaines, Ill.

[21] Appl. No.: 686,499

[22] Filed: Dec. 26, 1984

[51] Int. Cl.[4] .................. C10G 9/30; C10G 11/18; B01J 8/08
[52] U.S. Cl. .................. 208/138; 208/173; 208/DIG. 1; 34/22; 422/219
[58] Field of Search ............ 208/138, 148, 164, 165, 208/168, 173, 174, DIG. 1; 422/219; 34/22

[56] References Cited

U.S. PATENT DOCUMENTS

| | | | |
|---|---|---|---|
| 2,423,411 | 7/1947 | Simpson | 196/52 |
| 2,441,311 | 5/1948 | Crowley, Jr. et al. | 208/165 |
| 2,531,365 | 11/1950 | Simpson et al. | 196/52 |
| 2,851,401 | 9/1958 | Payne | 196/52 |
| 2,851,402 | 9/1958 | Haddad | 196/52 |
| 2,854,156 | 9/1958 | Payne | 214/17 |
| 2,854,161 | 9/1958 | Payne | 214/152 |
| 2,868,720 | 1/1959 | Fannestock | 208/173 |
| 2,903,420 | 9/1959 | Wilki | 208/165 X |
| 2,985,324 | 5/1961 | Balentine | 214/17 |
| 3,067,131 | 12/1962 | Bergstrom | 208/173 |
| 3,647,680 | 3/1972 | Greenwood et al. | 208/64 |
| 3,692,496 | 9/1972 | Greenwood et al. | 23/288 G |

*Primary Examiner*—John Doll
*Assistant Examiner*—Glenn A. Caldarola
*Attorney, Agent, or Firm*—Thomas K. McBride; William H. Page, II; Richard J. Cordovano

[57] ABSTRACT

Method and apparatus are provided for maintaining a substantially continuous gas flow through particulate solids in two zones. The solids are moved from a low pressure zone to a high pressure zone by means of a valveless lock hopper system. Maintenance of gas flow while simultaneously transferring particles between zones is accomplished without the use of moving equipment such as valves. The invention is particularly applicable in the regeneration of catalyst used in hydrocarbon conversion processes such as catalytic reforming.

9 Claims, 3 Drawing Figures

FIG. 3

MAINTAINING GAS FLOW DURING TRANSFER OF SOLIDS IN HYDROCARBON CONVERSION AND GAS-SOLID CONTACTING PROCESSES

FIELD OF THE INVENTION

This invention relates to the arts of solids flow and process control. More particularly, it relates to control of gas flow through zones containing solid particulate matter and control of internal pressure of these zones while the solid matter is transferred between zones. A specific use involves a catalyst treatment system for use in moving bed hydrocarbon conversion processes, including catalytic reforming.

INFORMATION DISCLOSURE

It is believed that U.S. Pat. No. 2,851,401 (Payne) is the most relevant reference. This patent deals with the transfer of solid particulate matter from one location to another, but contains no information regarding maintaining a flow of gas through said locations or maintaining pressures in said locations and does not teach the use of the gas conduits of the present invention. U.S. Pat. No. 2,851,402 (Haddad) provides information on solids transfer utilizing teachings of the Payne patent ('401).

An important application of the present invention involves catalyst which is used in hydrocarbon conversion processes. U.S. Pat. Nos. 2,423,411 (Simpson); 2,531,365 (Simpson et al); 2,854,156 (Payne); 2,854,161 (Payne); and 2,985,324 (Balentine) are exemplary of references where hydrocarbon process catalysts are transported and treated.

For additional information on catalytic reforming and regeneration of catalyst, which is the subject of a detailed example herein, U.S. Pat. Nos. 3,647,680 (Greenwood et al.) and 3,692,496 (Greenwood et al.) may be consulted.

BACKGROUND OF THE INVENTION

There are many chemical processes where it is necessary to bring into contact a gas and solid particulate matter, or solids, or particles. Frequently, chemical reactions as well as physical phenomena take place during such contact. In most cases, gas and solids must be in contact for a minimum time period and the desired chemical or physical reaction or change will not take place or will be incomplete if the contact is for a shorter period. In some cases there is a maximum contact time period, beyond which less than optimum or undesirable results will be obtained. It is highly desirable to conduct gas/solid contacting processes in a continuous or semi-continuous manner rather than as a batch operation.

A contacting zone is usually maintained at some positive pressure (above atmospheric) of the contacting gas. Particles must be introduced and withdrawn from the pressurized zone without losing contacting gas to the atmosphere. It is often necessary to maintain the internal pressure of the contacting zone at a particular value or within a certain range. Contacting zone pressure may be higher than that of the zone from which solids are provided to the contacting zone. Feeding solids into a zone against a high pressure poses numerous problems. When equipment, such as screw conveyors or star valves is used, contact between equipment and solids degrades the solids particles by breaking them into smaller particles and causes equipment wear. It is difficult to maintain effective sealing to prevent escape of gas from the contacting zone and equipment maintenance costs are high. These problems are magnified when solids or gas or both are at elevated temperatures. Pressure lock systems having on-off valves through which the solids pass have been the preferred method of feeding solids into a pressurized zone, but the valves are a high-maintenance item. A system using valves is briefly described below.

U.S. Pat. No. 2,851,401, cited above, discusses the problems involved in solids transfer and teaches transfer of solids without using mechanical equipment subject to wear or which degrades solids. However, this patent does not deal with the various aspects of gas flow, such as mentioned above. Also, it is often desirable to maintain a continuous as flow, even when the solids flow is batchwise. Use of continuous gas flow permits better control of contact time period and usually promotes the chemical or physical process taking place by constantly presenting fresh gas to the solids. In some cases, it is highly important to immediately contact incoming solids with fresh gas, that is, gas which has not yet had significant contact with solids.

The present invention is useful in the practice of a variety of processes and, in particular, in hydrocarbon conversion processes, such as catalytic reforming, which is the subject of the detailed example presented below. Another process in which the invention may be utilized is the conversion of $C_3/C_4$ LPG to light olefins. This catalytic dehydrogenation process will convert, for example, propane to propylene. In another catalytic hydrocarbon conversion process, LPG is processed to yield aromatics and hydrogen. The present invention is useful in regenerating the catalyst used in these processes. An example of a process other than hydrocarbon conversion in which the present invention may be applied is the treatment of a gas stream to remove a component by means of contact with particulate solids, such as removal of sulfur dioxide from a flue gas stream upon passing the flue gas through a bed comprising a sulfur oxide acceptor such as copper-bearing alumina spheres. However, the preferred use of the invention is in hydrocarbon conversion processes and specifically in moving bed catalytic reforming.

BRIEF SUMMARY OF THE INVENTION

The present invention comprises method and apparatus for maintaining a substantially continuous flow of a gas upward through a lower zone and then through an upper zone within a previously established flow rate range while simultaneously transferring particles downward from the upper zone to the lower zone.

The lower zone has a higher internal pressure than the upper zone and the internal pressures are independently variable. The particles are passed through the upper and lower zones during practice of a process for treatment of the particles or the gas. Either or both zones may be used primarily for a gas/particle contact operation or one zone may be primarily used for storage and feeding purposes.

It is an object of the invention to avoid the use of moving mechanical equipment in contact with particles.

It is also an object of the invention to avoid the use of costly and complex control instrumentation to maintain gas flow.

It is a further object to provide method and apparatus for accomplishing particle transfer without substantially affecting the internal pressures of the upper or lower zones.

In a broad embodiment, the invention is a method comprising (a) passing the gas into the lower zone, whereupon gas passes upward from the lower zone to a lock hopper zone through a lower particle transfer conduit which communicates between the lower zone and the lock hopper zone at a rate which prevents downward flow of particles through the lower particle transfer conduit, where an upper particle transfer conduit communicates between the lock hopper zone and the upper zone, where a lower portion of the upper zone, the upper particle transfer conduit, a lower portion of the lock hopper zone, and the lower particle transfer conduit are filled with particles without discontinuity, and where flow of particles downstream through the upper particle transfer conduit into the lock hopper is prevented because the level of particles in the lock hopper zone is at the lower end region of the upper particle transfer conduit; (b) simultaneously with step (a), passing gas from the lock hopper zone to the upper zone by means of an upper gas conduit which communicates and substantially equalizes pressure between these zones; (c) increasing the internal pressure of the lock hopper zone to a value substantially equal to the pressure of the lower zone by stopping gas flow through the upper gas conduit and passing gas from the lower zone to the lock hopper zone by means of a lower gas conduit which communciates and substantially equalizes pressure between these zones, causing particles to flow downward through the lower particle transfer conduit into the lower zone, and causing gas to flow from the lock hopper zone to the upper zone by means of the upper particle transfer conduit, at a gas rate which prevents downward flow of particles through the upper particle transfer conduit; and, (d) stopping gas flow through the lower gas conduit when the level of particles in the lock hopper zone falls to a previously determined low level point and simultaneously establishing a flow of gas through the upper gas conduit, causing particle flow out of the lower particle transfer conduit to the lower zone to cease and causing particles to flow out of the upper particle transfer conduit and into the lock hopper zone, said particle flow continuing until the level of particles in the lock hopper zone rises to the lower end region of the upper particle transfer conduit.

In another embodiment, the method of the invention comprises: (a) continuously passing the gas into the lower zone; (b) passing gas upward from the lower zone to a lock hopper zone through a lower particle transfer conduit which communicates between the lower zone and the lock hopper zone at a rate which prevents downward flow of particles through the lower particle transfer conduit and simultaneously passing gas from the lock hopper zone to the upper zone by means of an upper gas conduit which communicates and substantially equalizes pressure between these zones, thus permitting particles to flow from the upper zone downward to the lock hopper zone through an upper particle transfer conduit which communicates between the upper zone and the lock hopper zone; (c) when the level of particles in the lock hopper zone rises to a previously determined high level point, increasing the internal pressure of the lock hopper zone to a value substantially below the pressure of the lower zone and substantially above the pressure of the upper zone by stopping gas flow through the upper gas conduit, causing gas to flow from the lock hopper zone to the upper zone by means of the upper particle transfer conduit at a gas rate which prevents downward flow of particles through the upper particle transfer conduit; (d) passing gas from the lower zone to the lock hopper zone by means of a lower gas conduit which communicates and substantially equalizes pressure between these zones, causing particles to flow downward through the lower particle transfer conduit into the lower zone; (e) stopping gas flow through the lower gas conduit when the level of particles in the lock hopper zone falls to a previously determined low level point and simultaneously establishing flow of gas through the upper gas conduit, thus reestablishing the gas flow configuration of step (b), causing particle flow out of the lower particle transfer conduit to the lower zone to cease and causing particles to flow out of the upper particle transfer conduit and into the lock hopper zone.

Apparatus for practice of a broad embodiment of the invention comprises: (a) an upper zone containing particles, which zone is maintained at an independently variable first pressure; (b) a lower zone containing particles, which zone is maintained at an independently variable second pressure higher than said first pressure; (c) a lock hopper zone located below the upper zone and above the lower zone; (d) means for continuously supplying the gas to the lower zone; (e) an upper particle transfer conduit which communicates between the upper zone and the lock hopper zone; (f) a lower particle transfer conduit which communicates between the lock hopper zone and the lower zone; (g) an upper gas conduit and a block valve located in said conduit, which conduit communicates between the upper zone and the lock hopper zone; (h) a lower gas conduit and a block valve located in said conduit, which conduit communicates between the lock hopper zone and the lower zone; (i) means for generating a signal which initiates a transfer of particles out of the upper zone and transmitting said initiation signal; (j) means for sensing level of particles in the lock hopper zone and transmitting a signal when said level is at a previously determined low location; and (k) means for controlling the position of said block valves in such a manner that one of the valves is open when the other of the valves is closed so that a flow path for said gas supplied to the lower zone comprises either the lower particle transfer conduit and the upper gas conduit or the upper particle transfer conduit and the lower gas conduit, which position controlling means is responsive to said level signal and said initiation signal such that (i) upon receipt of said initiation signal the lower gas conduit block valve opens, permitting particle flow from the lock hopper zone through the lower particle transfer conduit to the lower zone, and the upper gas conduit block valve closes, causing gas to flow upward through the upper particle transfer conduit at a rate which prevents downward flow of particles through the upper particle transfer conduit, and (ii) upon receipt of said level signal the lower gas conduit block valve closes, causing gas to flow upward through the lower particle transfer conduit at a rate which prevents downward flow of particles through the lower particle transfer conduit, and the upper gas conduit block valve opens, permitting particle flow from the upper zone through the upper particle transfer conduit to the lock hopper zone.

BRIEF DESCRIPTION OF THE DRAWINGS

FIG. 2 is a schematic representation depicting the zones of FIG. 1 in a common vessel and depicting three steps in a five-step cycle comprising an eabodiment of the invention.

DETAILED DESCRIPTION OF THE INVENTION

For the purposes of promoting an understanding of the principles of the invention, reference will now be made to the embodiments illustrated in the drawings and specific language relating to a particular exemplary process will be used to describe the same. The use of these embodiments and this example is not intended to limit the scope of the invention in any way. The drawings depict only those components which are necessary in describing the invention, the use of additional required hardware being well within the purview of one skilled in the art.

The reforming of hydrocarbon feedstocks, such as a naphtha fraction derived from petroleum, utilizing a platinum group metal-alumina catalyst, is a process well known in the art. Briefly, a naphtha feedstock is admixed with hydrogen and contacted with the catalyst in a reaction zone, at reforming conditions of temperature and pressure to cause at least a portion of the naphtha feedstock to be upgraded to products of improved octane value. After a period of time in use, the catalyst used in the process must be regenerated, that is, it must be treated to restore it to a satisfactory level of activity and stability for catalyzing the reforming reactions. Regeneration consists of several different processing steps. One of the steps involves contacting the catalyst with a reducing gas comprising hydrogen in order to accomplish a reduction reaction. The above-cited U.S. Pat. No. 3,647,680 (Greenwood et al.) and 3,692,496 (Greenwood et al.) may be consulted for background information on reforming and catalyst regeneration.

In many modern catalytic reforming processes, catalyst is moved continuously or semi-continuously through a regeneration vessel, or through a series of regeneration vessels, in which the various steps involved in a regeneration cycle are performed. Due to the well-known difficulties involved in transferring solids from location to location, mentioned above, true continuous processing is difficult to achieve. The catalytic regeneration process of the above-mentioned Greenwood patents uses a semi-continuous movement of catalysts at certain points and continuous movement at other points of the regeneration vessel, or vessels. By semi-continuous movement is meant the repeated transfer of a relatively small amount of catalyst at closely spaced points in time. For example, one batch of catalyst may be transferred out of a vessel each two minutes. If the inventory in that vessel is sufficiently large, the movement approximates continuous transfer of catalyst. This principle is used in the present invention. It is not necessary to provide further information on regeneration processes, as such is easily available in numerous sources, such as the above-mentioned Greenwood patents, and is not required for an understanding of the invention.

Figure 1:
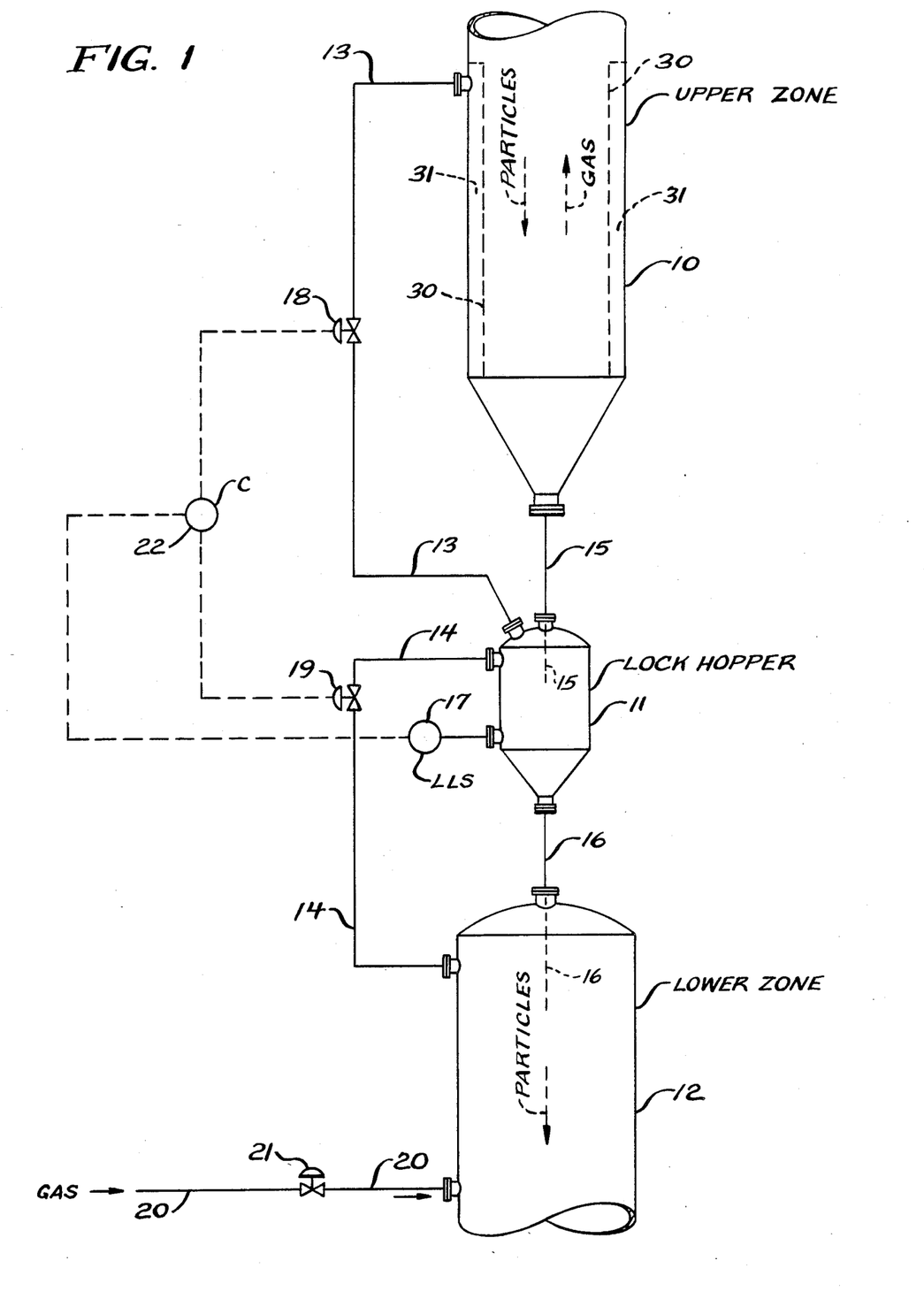
FIG. 1 is a schematic representation of an embodiment of the invention depicting an upper zone, a lock hopper zone, and a lower zone, where each zone is contained in a separate vessel.

Following is a description of the embodiment of the invention depicted in FIG. 1, using language specific to the above-discussed reforming process. Catalyst particles are accumulated in the bottom portion of vessel 10, or upper zone 10, entering from above, as shown by the arrow. In this zone, the portion of the catalyst regeneration cycle known as reduction takes place. Gas, comprising hydrogen, at a high temperature, is contacted with the catalyst particles in upper zone 10 in order to accomplish reduction.

It is very important that an uninterrupted flow of gas through the reducing zone be maintained. Should the flow be interrupted for any interval of time, reduction of the catalyst will not be properly accomplished, with the result that its ability to catalyze reforming reactions is severely impaired. Also, if the flow of reducing gas is sufficiently high so that the catalyst is fluidized or partially fluidized, the catalyst will be subject to physical damage.

After catalyst is reduced in upper zone 10, it is transferred to lower zone 12, which serves as a retention volume for catalyst flowing through the regeneration apparatus, and also serves an isolation function, while feeding catalyst to pneumatic conveying means for transporting the catalyst to a reforming reactor. Lower zone 12 is at a higher pressure than upper zone 10. For example, the upper zone could be maintained at a nominal pressure of 5 psig and permitted to vary within a range of 2 to 8 psig while the lower zone nominal pressure could be 35 psig, with a normal range of 30 to 40 psig. Thus, the differential pressure between the upper and lower zone might range between 22 and 38 psig. However, this invention may be used when the pressure differential between zones is much greater or much less. It may be in a range between 0.1 psig and 100 psig to 200 psig or more.

A vessel denoted lock hopper 11 is used in effecting the transfer of catalyst from zone 10 to zone 12. Catalyst passes from zone 10 to lock hopper 11 through upper particle transfer conduit 15, which sealably extends through a nozzle on the top of lock hopper 11 to project into lock hopper zone 11. Catalyst passes from lock hopper 11 to lower zone 12 via lower particle transfer conduit 16, which sealably extends into lower zone 12. As will be shown below, the extension of conduit 16 into lower zone 12 is not required; while a minimum length of conduit is required, it may be outside the vessels. The extension of conduit 15 into lock hopper 11 is not necessary when means for monitoring particle level at a high location in lock hopper zone 11 is provided, but is required when no high level instrumentation is provided. Such high level instrumentation is not shown in FIG. 1, since it is not necessary to the embodiment depicted therein, but will be described below.

A common prior art procedure is to locate valves in conduit 15 and 16, between the three vessels, so that lock hopper 11 can be alternately filled with catalyst from upper zone 10 with the valve in conduit 16 closed, and then discharged to lower zone 12 while the valve in conduit 15 is in a closed position. However, as mentioned above, it is highly desirable to avoid the use of moving equipment, including valves, in the transfer paths of catalyst particles.

Reducing gas enters lower zone 12 through conduit 20. Valve 21 regulates the quantity of gas flowing into lower zone 12; this flow rate may be varied independently of the invention by means for controlling the pressure of lower zone 12 (not shown). For example, the pressure of lower zone 12 might be varied, within a previously established flow range, in response to signals from the above-mentioned pneumatic conveying means.

Gas may flow from lower zone 12 to upper zone 10 via one of two alternate paths, where the lock hopper zone is a part of each path. One gas flow path comprises conduit 16, lock hopper 11, and upper gas conduit 13. The other flow path comprises lower gas conduit 14, lock hopper 11, and conduit 15. Since in the first mentioned path, catalyst occupies the lower portion of vessel 10 and the gas enters above the catalyst level, it is necessary in upper zone 10 to provide means for conveying gas downward and distributing it, so that contact between gas and catalyst takes place. This is accomplished by cylindrical baffle 30, which is smaller in diameter than upper vessel 10 and disposed in a concentric manner inside it to form an annular space. The top of the annular space is closed to gas flow by means of an annular horizontal plate. The open center area of the annular plate permits flow of catalyst and gas. Gas entering the annular space from conduit 13 must therefore flow downward to the bottom of cylindrical baffle 30 and make a 180° turn to flow upward through the catalyst.

The internal pressure of upper zone 10 is independently controlled by means not shown on the drawing. For example, upper zone 10 might be connected, by means of a conduit, to another vessel used in the catalytic reforming process, so that the upper zone pressure depends upon and varies with the pressure in that vessel.

Low level switch 17 is provided at lock hopper 11 to sense when catalyst level in the lock hopper zone is at a previously determined low level and transmit a signal to controller 22. Controller 22 adjusts the positions of valves 18 and 19, which are on-off valves in this embodiment of the invention. Controller 22 also includes a timer, which generates or causes to be generated a cycle initiation signal at a frequency determined by adjusting the timer. The cycle initiation signal causes valves 18 and 19 to move to the start of a particle transfer cycle, as will be explained below.

The following description is presented with reference to both FIGS. 1 and 2. The above description relating to FIG. 1 also applies to FIG. 2. It can be seen that the same reference numbers used in FIG. 1 also appear on FIG. 2 where appropriate. Certain items have been omitted from FIG. 2 for drawing convenience, such as controller 22 and valve 21, but it is to be understood that these items are required for the operation of the embodiment of FIG. 2. In FIG. 2, which depicts a preferred arrangement, the three zones of FIG. 1 are located in a single vessel rather than separate vessels. In FIG. 1, lower gas conduit 14 communicates between lower zone 12 and lock hopper 11 and upper gas conduit 13 communicates between lock hopper 11 and upper zone 10. In FIG. 2, the gas conduits are shown with a common portion 26. Thus, in FIG. 2, lower conduit 14 includes a portion labeled reference number 26 and upper conduit 13 includes a portion labeled reference number 26.

Figure 2A:
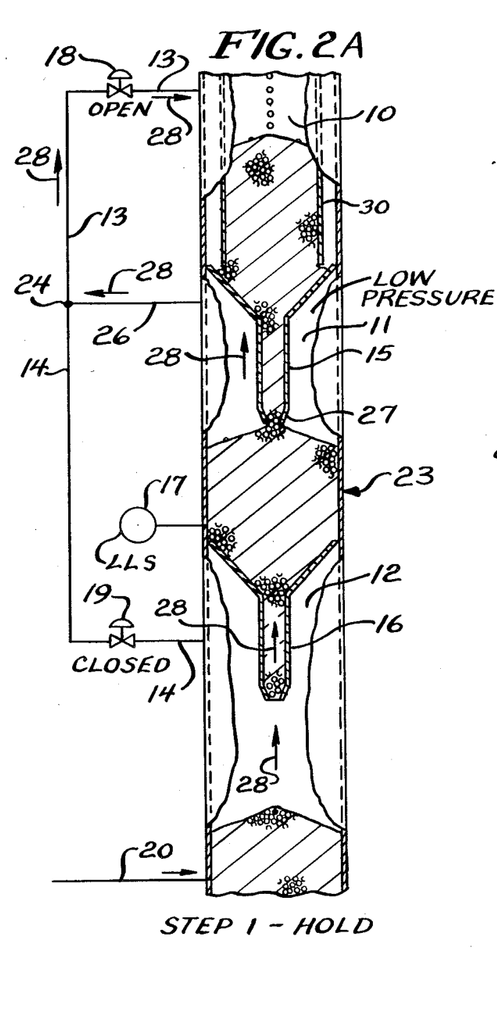
FIGS. 2A, 2B, and 2C depict, respectively steps 1, 3 and 5 of the cycle.

Transfer of catalyst particles from reducing zone 10 to lower zone 12 without using valves, while maintaining a flow of gas through the zones, may be accomplished with a five-step cycle. Three of the five steps are shown in FIG. 2. A single cycle results in the transfer of one batch of particles from the upper zone to the lower zone. FIG. 2A depicts step 1 of the cycle, where the apparatus is in a hold or ready mode. Lock hopper 11 is filled to its maximum capacity with catalyst. There is an inventory of catalyst in reducing zone 10, which catalyst remains in the zone for a time sufficient to attain proper reduction. Conduits 15 and 16 are filled with catalyst so that there is no discontinuity in a mass of catalyst occupying a lower portion of reducing zone 10, upper transfer conduit 15, a lower portion of lock hopper zone 11, and lower transfer conduit 16. The inventory in upper zone 10 is replenished with catalyst from that portion of the regeneration apparatus located above the upper zone (not shown). Catalyst accumulation in lower zone 12 is depicted.

Gas passes from lower zone 12 to lock hopper 11 through lower transfer conduit 16 during step 1. The differential pressure between the lower and lock hopper zones may be in a range between 0.1 and 100 psig or more, with the lower value usually above 5 psig. Downward flow of particles from lock hopper zone 11 to lower zone 12 is prevented at this time by upward flow of gas through lower transfer conduit 16. With a high upward flow rate of gas and a relatively low depth of catalyst above upper transfer conduit 16, the particles in conduit 16 may be pushed upward into zone 11, causing a large increase in gas flow and partial fluidization of catalyst in zone 11. In the design of the apparatus, a minimum length of conduit 16 plus a minimum depth of the particle bed immediately above it must be specified, based on the maximum gas flow rate expected/required through conduit 16. In establishing this length plus depth above the minimum, it is necessary to consider the minimum required flow of gas and the pressure differential between zones. For a particular pressure differential, the longer the conduit, the lower the gas flow. Conduit diameter may be increased in order to increase gas flow at a given conduit length and pressure differential.

Flow of catalyst from upper zone 10 to lock hopper zone 11 does not occur at this time (step 1) by virtue of the fact that the level of particles in lock hopper zone 11 is at the end region of upper transfer conduit 15; reference number 27 denotes the end region. It can be seen that for catalyst to flow out of conduit 15 (FIG. 2A), catalyst at the end region of the conduit and outside of the conduit must be displaced. A sufficient amount of force to accomplish displacement is not available in this situation and the level never rises above the end region.

In step 2 (not shown) of the cycle, which may be denoted the pressurization step, valve 18 is closed and valve 19 in lower gas conduit 14 is opened. This results in the equalization of pressure between the lock hopper zone and the lower zone; thus the lock hopper zone internal pressure increases in this step, so that it becomes greater than the internal pressure of the upper zone. Upon completion of pressurization of the lock hopper zone, step 3 of the cycle is entered. The time required for step 3 is quite short.

Figure 2B:
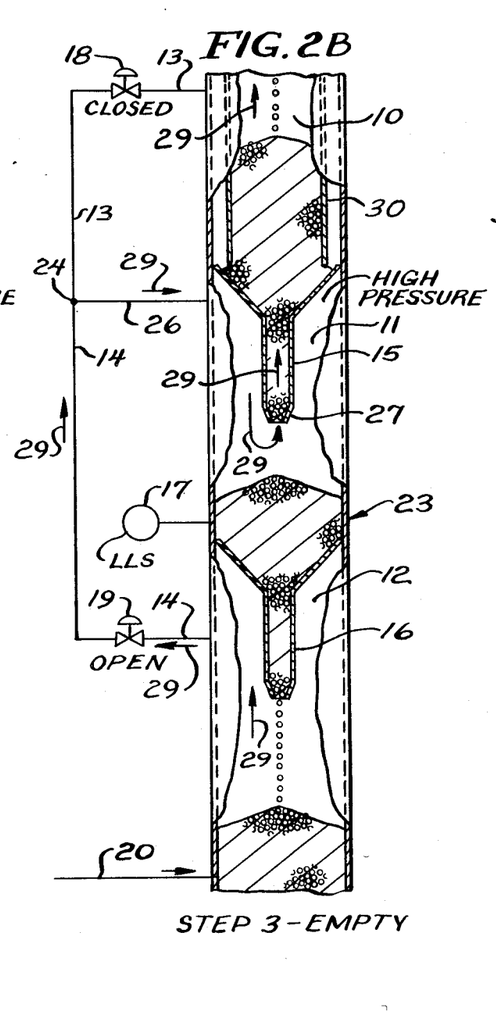

FIG. 2B depicts the latter portion of step 3 of the cycle, in which the catalyst level in lock hopper zone 11 is near its normal low point. Step 3 is referred to as the "empty" portion of the cycle, where the lock hopper is emptied of catalyst. Flow of solids from the upper zone into the lock hopper zone is prevented by flow of gas upward through upper transfer conduit 15, in the same manner as discussed above in regard to conduit 16. The level of particles in the lock hopper zone falls as solids flow out of conduit 16 to lower zone 12. During this time, the gas entering via line 20 flows through lower gas conduit 14 and valve 19 to enter the lock hopper zone. The pressures of the lower zone and the lock hopper zone are substantially the same at this time (step 3) though, of course, a small pressure difference exists, since there is flow through conduit 14.

It can be seen that the gas flow path of steps 2 and 3 is different from that of step 1, but that there is no interruption in gas flow caused by the transition from step 1 to step 2. Arrows 28 indicate the gas flow path in step 1 and arrows 29 depict the flow of gas in step 3. It may be desirable to program a slight delay in closing of valve 18 at the start of step 2, on the order of a few seconds or less. This would ensure that if valve 19 were to open relatively slowly, there would be no significant transient flow disturbance due to valve operation.

When the level in lock hopper zone 11 falls to a previously determined low point, step 4, depressurization, is initiated. Low level switch 17 detects the absence of particles at said low point as soon as particle level falls to that location and immediately transmits a signal to controller 22. Controller 22 causes valve 19 to close and valve 18 to open, thus depressurizing lock hopper zone 11 and changing the gas flow path to the same configuration as in step 1. Step 4 ends when the pressure in the lock hopper zone becomes substantially equal to the pressure of the upper zone. In step 5, catalyst enters the lock hopper zone via conduit 15. Step 5 differs from step 1 in that lock hopper 11 is full during step 1 and there is no flow of catalyst at all in step 1. During step 5, catalyst flows from upper zone 10 to lock hopper zone 11 until the level rises to the end region of upper transfer pipe 15, thus completing the cycle and returning to a hold mode, represented by step 1.

This cycle of five steps is normally repeated continuously. For example, it may take approximately 50 seconds to transfer one batch of catalyst from upper zone 10 to lower zone 12. Controller 22 is capable of accepting a desired cycle repetition rate, which is usually manually entered, and sending a signal to initiate a cycle, that is, the movement of valves 18 and 19 so that step 2 is entered. A practical maximum cycle repetition rate for a 50-second cycle would be about once per 60 seconds. The catalyst transfer rate would then be, if the volume of the lock hopper zone between normal maximum capacity (level at conduit 15 end region) and the low level switch were one cubic foot, one cubic foot per minute. A transfer rate of half of that maximum would require that controller 22 initiate a new cycle every two minutes.

Controller 22 functions as means for receiving a level signal from low level switch 17, means for controlling the positions of block valves 18 and 19, and means for an operator to set a cycle repetition rate. There are many different types of apparatus capable of performing the functions of controller 22, such as process control computers and programmable controllers. Also, these functions can be accomplished by means of a cycle timer to provide signals to initiate a cycle and a flip-flop control device responsive to low level switch 17 for providing signals to enter step 4.

The length of conduits 15 and 16 are quite important to the operation of the system, as explained above. The magnitude of the permissible pressure differential between zones is dependent primarily on the length of the column of particles between zones, for a given diameter of transfer conduit and particle type. The length of the column of particles between zones is defined as the length of the transfer conduit plus the depth of the bed of particles above it in the zone, where the lowest point of the bed of particles is at the bottom of the conical section of the zone. If the pressure differential is too high, the catalyst will be blown out of the transfer pipe and up into the zone above it. In experimental work, as pressure in a zone was increased, blowout was manifested by a loud noise and could be clearly observed in the zone above the transfer pipe. If the pressure differential between zones is too low, the gas flow rate will be too low, resulting in poor catalyst regeneration. The column of catalyst through which the gas flows upward may be viewed as a resistance to flow; flow rate through such a resistance, or restriction, varies with pressure drop across the restriction.

In a typical design situation, the pressure differential across a lock hopper is known, since it is normally independently fixed by factors having no relationship to the lock hopper system. Thus the starting point in design is the given pressures of pressure ranges in the upper zone and lower zone. The required maximum and minimum flow rates of gas upward through the zones and the required particle transfer rate are also known, being set by the process. The length of the catalyst column and the diameter of the particle transfer pipe are then considered. A balance between length and diameter is required to achieve the desired gas rate at the same time as the desired instantaneous flow rate of particles. Shortening the length with other factors constant or increasing the diameter with other factors constant will result in blowout if carried too far. Another feature of importance during design is the length of each of the components which make up the total column height of particles. Gas flow through the transfer pipe requires a significantly higher pressure drop per unit length than the same gas flow through the particle bed immediately above the transfer pipe. It should also be noted that gas flow rate through the particle bed must always be less than the rate which will cause fluidization of the particles. Those skilled in the art will now appreciate the interplay of variables and how to adjust each to obtain an appropriate design. Principles of solids flow are known to those skilled in the art and need not be discussed herein. For additional information on solids flow in the context of this invention, U.S. Pat. No. 2,851,401, mentioned above, may be consulted, though it does not deal with gas flow. It should be noted that common practice in design of solids flow systems is to conduct experiments to determine flow characteristics of the particular solid involved.

Figure 3:
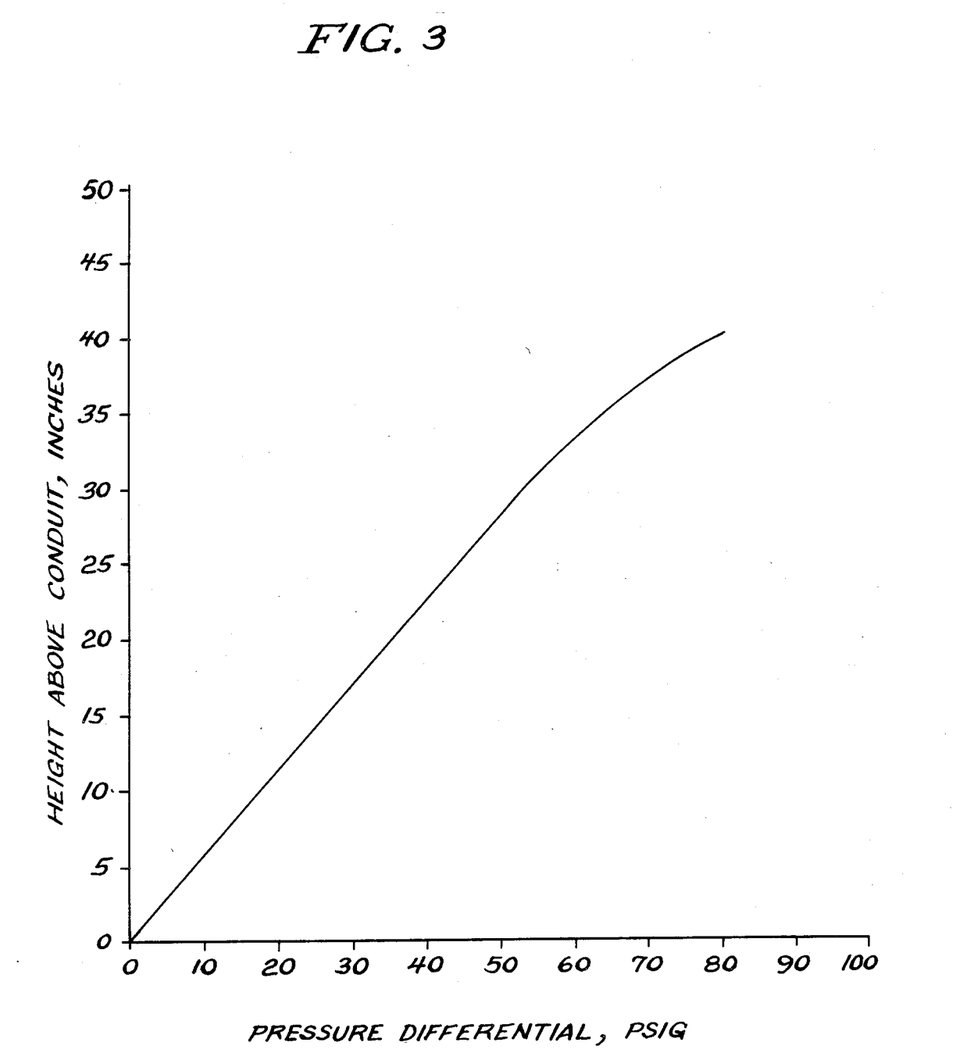
FIG. 3 is a graph relating minimum required heights of particles in a first zone directly above a particle transfer conduit of a particular constant size which communicates between the first zone and a second zone to pressure differentials between the first and second zones. The relationship applies to only one particular system; if, for example, different particles and/or a different length or diameter transfer conduit is used, this graph may not be applicable.

FIG. 3 shows the results of certain experiments using new catalyst and air pressure in a four foot long two-inch Schedule 40 pipe attached to a 45° cone bottom portion of a cylindrical vessel having an inside diameter of 15 ¼ inches. The vessel was filled with catalyst to various heights and air was introduced at the bottom of the column of catalyst. Air pressure was slowly increased until the catalyst blew out of the pipe up into the vessel. Blowout pressure was plotted against depth of catalyst in the vessel. The curve was drawn not through the points, but slightly to the left of all the valid data points. Thus, the portion to the left of the curve represents a safe design area. For example, a catalyst depth of 20 inches (with a total column height of 68 inches) is sufficient to withstand a pressure differential between zones of 30 psig. FIG. 3 cannot be used as a general guide to design; it deals with a new catalyst having specific characteristics, a particular pipe size and material, and a particular gas at one temperature. It is a well-recognized requirement that solids handling systems must be designed based on experimentation under conditions expected in the finished system.

FIG. 3 does not supply information on the maximum lengths of transfer pipes or the maximum bed depths. As discussed above, maximum length depends on the minimum required flow of gas and the pressure differential. Data is available in the literature to enable calculation of pressure drops for gases flowing in conduits packed with solids. However, it must be noted that experimentation should be done when certain types of solids are involved, such as those which are irregular in size.

It can be seen that design of a system of this invention requires careful calculations. Given the internal pressures of the upper and lower zones, the minimum and maximum gas flow rates required by the process, the identities of the gas and the particles, and the required range of particle transfer rates, the system designer must carefully choose the size of the lock hopper zone, in particular the normal minimum and maximum volumes occupied by the particles, the lock hopper zone bed depth above the transfer conduit, the diameter of the transfer conduits, and the lengths of the transfer conduits. Of course, there are other parameters to be chosen by the designer, such as gas conduit size, but these are the most important.

The objectives of this invention might also be obtained in a totally different manner by providing gas conduits supplying the upper zone and/or the lock hopper zone. However, it can be seen, by considering the required control instrumentation, that such a method involves cost and complexity far beyond that of the present invention. This invention involves controlling gas flow by means of the required particle flow rate, by carefully specifying certain equipment sizes.

Figure 2C:
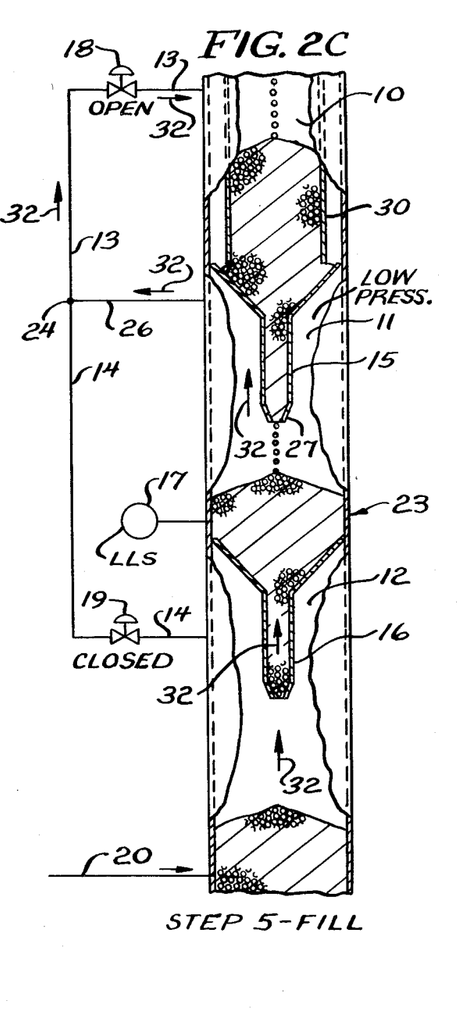

It can be readily seen by reference to FIG. 2 and the flow paths indicated by the sequence of arrows 28, 29, and 32 in FIGS. 2A, 2B, and 2C, that both of the alternate flow paths between the outlet of conduit 20 and the top portion of upper zone 10 involve substantially the same pressure drop at all times. The pressure drop of gas flowing through catalyst in the large diameter portions of the apparatus is small in comparison to the pressure drop of gas flowing in the transfer conduits.

The apparatus of the invention may be used as a solids flow control device for an entire process, since the flow rate of particles from the upper zone to the lower zone can be varied, as discussed above.

In the experimentation discussed above in regard to FIG. 3, the pressure differential required to stop flow through the 48-inch long transfer pipes was in the area of 1 or 2 psig. Thus it can be seen that gas flow is the primary design criteria and stopping of particle flow takes place even at small gas flows.

It is necessary that the lower end of a partical transfer conduit have a smaller cross-sectional area for particle flow than the balance of the conduit; this is referred to as a restriction. For example, in the case of a circular conduit, the inside diameter of the end may be less than that of the balance of the conduit, such as is shown in FIG. 2A at reference number 27. The purpose of the restriction is to keep the particle transfer conduit full of particles when the pressures of the zones between which the transfer conduit communicates are about the same. When the pressures are not equal and gas is flowing upward, the particles will remain in the conduit. In a system such as is shown in FIG. 1, the most effective flow restriction exists at the point where the upper end of the conduit joins the cone bottom of the bed. A flow restriction which is more effective than this one is required. Without the restriction, particles passing through a conduit will be in dilute phase and when a pressure differential between zones is established, the conduit will be only partially full of particles, thus defeating the invention.

In another embodiment of this invention, a high level sensor may be used to limit the level of particles in the lock hopper zone to a point below the end region of the upper particle transfer conduit. When the high level point is adjustable over a range, the size of each batch transferred may be adjusted. When the lock hopper zone reaches a high level point, the high level sensor provides a signal to controller 22 and controller 22 closes the upper gas conduit block valve, leaving the lower conduit block valve also in the closed position. The gas path between the upper and lower zones then comprises both the upper and lower particle transfer conduits, so that particle flow in both conduits is prevented. Then when it is desired to start a cycle from this hold position comprising two closed block valves, the lower gas conduit block valve is opened to start the lock hopper empty step.

A reason for using a high level instrument instead of letting particle level rise to the lower end region of the upper particle transfer conduit is that, in this situation, gas flowing up the conduit tends to agitate the particles at the lower end region. This agitation may cause physical damage to the particles. Another method which has been proposed to solve this problem, should it occur, is to provide a perforated conduit portion at the lower end of the conduit. All or a portion of the gas would then flow through the perforations, thereby by-passing the catalyst and not causing agitation. The catalyst level would not rise beyond the lower end of the perforated portion of the conduit. Screening material could be used to form the perforated conduit.

I claim as my invention:

1. A method for maintaining a substantially continuous flow of a gas upward through a lower zone and then through an upper zone within a previously established flow rate range while simultaneously transferring particles downward from the upper zone to the lower zone, which lower zone has higher internal pressure than the upper zone, where said upper zone and lower zone internal pressures are independently variable, and where the particles are passed through the upper and lower zones during practice of a process for treatment of the particles or the gas, said method comprising:

(a) passing the gas into the lower zone, whereupon gas passes upward from the lower zone to a lock hopper zone through a lower particle transfer conduit which communicates between the lower zone and the lock hopper zone at a rate which prevents downward flow of particles through the lower particle transfer conduit, where an upper particle transfer conduit communicates between the lock hopper zone and the upper zone, where a lower portion of the upper zone, the upper particle transfer conduit, a lower portion of the lock hooper zone, and the lower particle transfer conduit are filled with particles without discontinuity, and where flow of particles downstream through the upper particle transfer conduit into the lock hopper is prevented because the level of particles in the lock hopper zone is at the lower end region of the upper particles transfer conduit;

(b) simultaneously with step (a), passing gas from the lock hopper zone to the upper zone by means of an upper gas conduit which communicates and substantially equalizes pressure between these zones;

(c) increasing the internal pressure of the lock hopper zone to a value substantially equal to the pressure of the lower zone by stopping gas flow through the upper gas conduit and passing gas from the lower zone to the lock hopper zone by means of a lower gas conduit which communicates and substantially equalizes pressure between these zones, causing particles to flow downward through the lower particle transfer conduit into the lower zone, and causing gas to flow from the lock hopper zone to the upper zone by means of the upper particle transfer conduit, at a gas rate which prevents downward flow of particles through the upper particle transfer conduit; and, (d) stopping gas flow through the lower gas conduit when the level of particles in the lock hopper zone falls to a previously determined low level point and simultaneously establishing a flow of gas through the upper gas conduit, causing particle flow out of the lower particle transfer conduit to the lower zone to cease and causing particles to flow out of the upper particle transfer conduit and into the lock hopper zone, said particle flow continuing until the level of particles in the lock hopper zone rises to the lower end region of the upper particle transfer conduit.

2. The method of claim 1 further characterized in that a cycle comprising steps (a) through (d) is continuously repeated at a rate sufficient to achieve a desired transfer rate of particles from the upper zone to the lower zone.

3. The method of claim 1 further characterized in that said particles comprise catalyst used in a hydrocarbon conversion process and said process for treatment of particles is regeneration of catalyst.

4. The method of claim 3 further characterized in that said catalyst comprises a platinum group metal.

5. The method of claim 3 further characterized in that said hydrocarbon conversion process is moving bed catalytic reforming.

6. The method of claim 3 further characterized in that said upper zone is a reducing zone.

7. The method of claim 3 further characterized in that said lower zone is a reducing zone.

8. A method for maintaining a substantially continuous flow of a gas upward through a lower particle-containing zone and then through an upper particle-containing zone within a previously established flow rate range while simultaneously transferring particles downward from the upper zone to the lower zone, which lower zone has a higher internal pressure than the upper zone, where said upper zone and lower zone internal pressures are independently variable, and where the particles are passed through the upper and lower zones during practice of a process for treating of the particles or the gas, said method comprising:

(a) continuously passing the gas into the lower zone;

(b) passing gas upward from the lower zone to a lock hopper zone through a lower particle transfer conduit which communicates between the lower zone and the lock hooper zone at a rate which prevents downward flow of particles through the lower particles transfer conduit and simultaneously passing gas from the lock hopper zone to the upper zone by means of an upper gas conduit which communicates and substantially equalizes pressure between these zones, thus permitting particles to flow from the upper zone downward to the lock hopper zone through an upper particle transfer conduit which communicates between the upper zone and the lock hopper zone;

(c) when the level of particles in the lock hopper zone rises to a previously determined high level point, increasing the internal pressure of the lock hopper zone to a value substantially below the pressure of the lower zone and substantially above the pressure of the upper zone by stopping gas flow through the upper gas conduit, causing gas to flow from the lock hopper zone to the upper zone by means of the upper particle transfer conduit at a gas rate which prevents downward flow of particles through the upper particle transfer conduit;

(d) passing gas from the lower zone to the lock hopper zone by means of a lower gas conduit which communicates and substantially equalizes pressure between these zones, causing particles to flow downward through the lower particle transfer conduit into the lower zone; and, (e) stopping gas flow through the lower gas conduit when the level of particles in the lock hopper zone falls to a previously determined low level point and simultaneously establishing flow of gas through the upper gas conduit, thus re-establishing the gas flow configuration of step (b), causing particle flow out of the lower particle transfer conduit to the lower zone to cease and causing particles to flow out of the upper particle transfer conduit and into the lock hopper zone.

9. the method of claim 8 further characterized in that a cycle comprising steps (a) through (e) is continuously repeated at a rate sufficient to achieve a desired transfer rate of particles from the upper zone to the lower zone.

* * * * *